United States Patent
Kim et al.

(10) Patent No.: US 8,355,412 B2
(45) Date of Patent: Jan. 15, 2013

(54) METHOD AND SYSTEM FOR POWER SAVING IN ASYNCHRONOUS COMMUNICATION SYSTEM

(75) Inventors: Yong-suk Kim, Daejeon (KR); Seung-hyong Rhee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 2001 days.

(21) Appl. No.: 11/158,327

(22) Filed: Jun. 22, 2005

(65) Prior Publication Data
US 2006/0055958 A1   Mar. 16, 2006

(30) Foreign Application Priority Data
Jun. 22, 2004   (KR) .................. 2004-46453

(51) Int. Cl.
*H04L 12/413* (2006.01)
(52) U.S. Cl. ...................................... 370/445
(58) Field of Classification Search .............. None
See application file for complete search history.

(56) References Cited

U.S. PATENT DOCUMENTS

| | | | |
|---|---|---|---|
| 6,404,756 B1* | 6/2002 | Whitehill et al. | 370/338 |
| 7,095,732 B1* | 8/2006 | Watson, Jr. | 370/346 |
| 2002/0016151 A1* | 2/2002 | Romans | 455/13.4 |
| 2002/0150095 A1* | 10/2002 | Sherman | 370/389 |
| 2005/0240245 A1* | 10/2005 | Bange et al. | 607/60 |
| 2007/0140199 A1* | 6/2007 | Zhao et al. | 370/338 |

FOREIGN PATENT DOCUMENTS

| | | |
|---|---|---|
| JP | 9-139708 | 5/1997 |
| JP | 2003-229869 | 8/2003 |

OTHER PUBLICATIONS

Bharghavan et al., MACAW: A Media Access Protocol for Wireless LAN's, 1994, ACM, SIGCOMM 94-8/94 London England UK, all pages.*
Office Action issued in corresponding Japanese Patent Application No. 2005-181344, mailed on Oct. 24, 2007.

* cited by examiner

*Primary Examiner* — Otis L Thompson, Jr.
(74) *Attorney, Agent, or Firm* — Staas & Halsey LLP

(57) ABSTRACT

A method for transmitting data from a second device to a first device in a communication system including at least two devices that enter a sleep mode and a wake-up mode in an alternative manner. The first device of which state is changed from the sleep mode to the wake-up mode broadcasts a message containing state change information to adjacent devices. The second device that receives the message containing the state change information informs the first device of the presence of data to be transmitted. The first device that is informed of the data to be transmitted sends a message permitting the data transfer. The second device upon receiving the message transmits the data to the first device.

17 Claims, 6 Drawing Sheets

METHOD AND SYSTEM FOR POWER SAVING IN ASYNCHRONOUS COMMUNICATION SYSTEM

This application claims the benefit under 35 U.S.C. §119 (a) from Korean Patent Application No. 2004-46453 filed on Jun. 22, 2004 in the Korean Intellectual Property Office, the entire disclosure of which is incorporated herein by reference.

BACKGROUND OF THE INVENTION

1. Field of the Invention

The present invention generally relates to power management in a carrier sense multiple access with collision avoidance (CSMA/CA), and more specifically, relates to asynchronous power management thereof.

2. Description of Related Art

Current wireless data communication systems have been developed on the assumption that the communication systems use their own frequency bands. However, the 2.4 GHz Industrial, Scientific and Medical (ISM) band is shared by systems including wireless local area networks (LANs), Bluetooth devices, home radio frequency (RF) devices, medical equipment, and microwave devices and the like. As a great number of systems use the limited frequency band, collisions are unavoidable in transmitting and receiving modulation frequencies.

In order to avoid interference or data collisions between communication systems, a carrier sense multiple access with collision avoidance (CSMA/CA) scheme is utilized. The CSMA/CA scheme sends a signal indicating the presence of data to be transmitted before a sending end transmits the data, and transmits the data only upon receiving a response to the signal from a receiving end. Accordingly, it is possible to prevent and avoid data collisions with other data transmitted by other sending ends.

According to the CSMA/CA scheme, each device carries out power management to save the power consumption. Each device repeatedly enters a sleep mode and a wake-up mode to reduce the power consumption. A device in the sleep mode suspends data transmission and/or reception, and a device in the wake-up mode restarts to transmit and/or receive data to and from other devices.

The power management includes synchronous power management and asynchronous power management, which are explained in that order.

The synchronous power management synchronizes with all devices in a network. Simultaneously, the synchronized devices maintain the wake-up mode in a certain period. A device storing data to be transmitted to another device in the wake-up mode sends a signal indicating the presence of such data. Other devices receiving the signal maintain the wake-up mode.

A device not receiving the signal indicating the presence of the data to be transmitted to another device or a device having no data to be transmitted maintains the sleep mode. The synchronous power management has a disadvantage of higher power consumption since all the devices repeatedly and uniformly enter the sleep mode or the wake-up mode. The asynchronous power management is presented to address this problem.

According to the asynchronous power management, the devices in the network independently enter the sleep mode and the wake-up mode. That is, the devices each adjust their states into the sleep mode or the wake-up mode depending on their power condition. A device storing a large amount of power sets the wake-up mode longer than the sleep mode, and a device storing a small amount of power sets the sleep mode longer than the wake-up mode. The data transmission and reception of the asynchronous power management are the same as those of the synchronous power management.

FIG. 1 depicts a first device 100 which receives data and a second device 102 which transmits the data according to the asynchronous power management. Referring to FIG. 1, drawbacks of the conventional asynchronous power management are described.

The first device 100 is in the sleep mode and the second device 102 is in the wake-up mode as shown in FIG. 1. When the second device 102 has data to be transmitted to the first device 100, the second device 102 needs to inform the first device 100 of the presence of the data to be transmitted prior to the data transmission. Hereinafter, a signal indicating the presence of the data to be transmitted is referred to as a request-to-send (RTS) message.

The second device 102 sends the RTS message to the first device 100. The first device 100 being in the sleep mode cannot receive the RTS message, and also cannot send a response message to the RTS message. Thus, the second device 102 recognizes that the first device 100 does not accept the data transmission, and repeats transmission of the RTS message to the first device 100. As a result, the power consumed by the second device 102 considerably increases.

BRIEF SUMMARY

An aspect of the present invention provides a solution to the above-mentioned and other problems and disadvantageous occurring in the conventional arrangement, and an aspect of the present invention provides a method and system for reducing power consumed by a device which adopts asynchronous power management.

Another aspect of the present invention provides a method and system for collecting states of devices in a network.

A further aspect of the present invention provides a method and system for efficiently managing power by use of collected information.

According to an aspect of the present invention, there is provided a method of transmitting data from a second device to a first device in a communication system including at least the two devices, the first and second devices entering a sleep mode and a wake-up mode in an alternating manner, including: broadcasting from the first device a message containing state change information to devices adjacent to the first device of which a state is changed from the sleep mode to the wake-up mode; transmitting from the second device to the first device a message advising of the presence of data to be transmitted by the second device upon receipt by the second device of the message containing the state change information; transmitting from the first device to the second device a message permitting transfer of the data to be transmitted upon receipt by the first device of the message of the presence of data to be transmitted; and transmitting the data from the second device to the first device upon receipt by the second device of the message permitting transfer of the data to be transmitted.

According to another aspect of the present invention, there is provided a system for transmitting and receiving data in a communication system including at least two devices that enters to a sleep mode and a wake-up mode in an alternating manner, including: a first device to broadcast a message containing state change information to adjacent devices when the first device changes from the sleep mode to the wake-up mode, and to transmit a message permitting data transfer when the first device is informed of data to be transmitted; and a second device to inform the first device of the presence of the data to be transmitted when the message containing the state change information is received, and to transmit the data to the first device when the message permitting the data transfer is received.

According to another aspect of the present invention, there is provided a communication system, including: a first device switchable between a sleep mode in which the device cannot receive messages and a woken-up mode in which the device can receive messages; and a second device switchable between the sleep mode and the woken-up mode. The first device broadcasts a request-to-request-to-transmit (RRTS) message to nearby devices when the first device changes from a sleep mode to a wake-up mode, the second device sends a request-to-transmit (RTS) message to the first device after receiving the RRTS message when data to be transmitted to the first device is present, the first device sends a clear to transmit (CTS) message to the second device after receiving the RTS message, and the second device sends the data to the first device after receiving the CTS message.

According to another aspect of the present invention, there is provided a method of reducing power consumption when transmitting data between devices in a communication system including at least the two devices which alternately enter sleep and awake modes, including: sending a notification from one device to adjacent devices that the one device is awake and ready to receive data; sending an indication to the one device of the presence of data to be transmitted by another device to the one device after the another device receives the notification; sending a message to the another device that at least one frequency is available to transmit the data to the one device after the one device receives the indication; and transmitting the data from the another device to the one device after the another device receives the message.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENT

Figure 1:
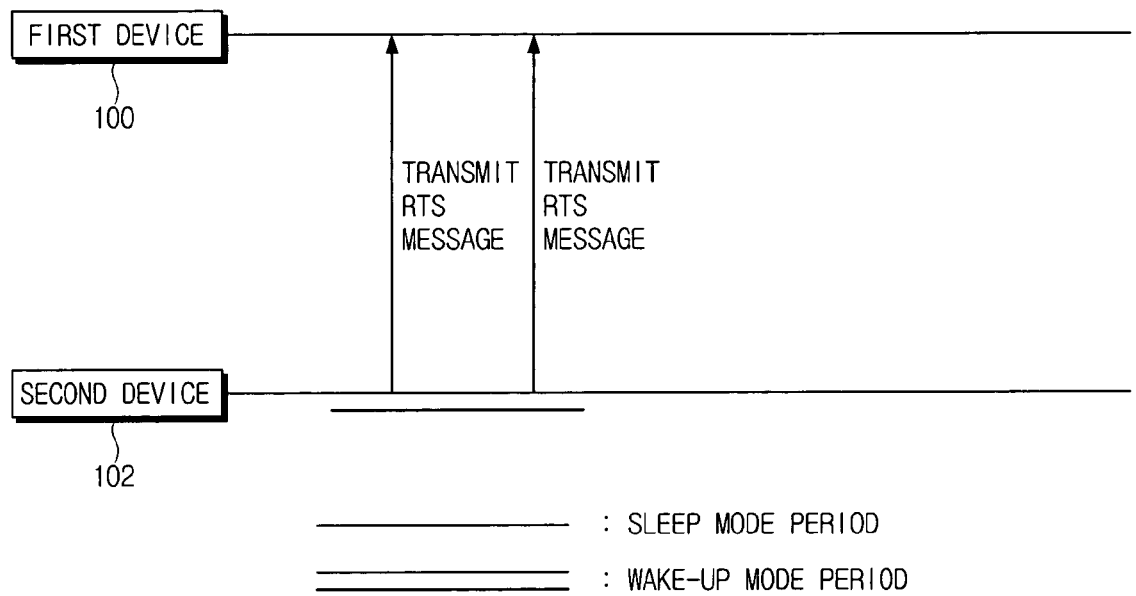
FIG. 1 illustrates conventional message transmission and reception between devices based on a carrier sense multiple access with collision avoidance (CSMA/CA) scheme.

Reference will now be made in detail to an embodiment of the present invention, examples of which are illustrated in the accompanying drawings, wherein like reference numerals refer to the like elements throughout. The embodiment is described below in order to explain the present invention by referring to the figures.

A method for a device to inform its adjacent devices of its state in a network is explained according to an embodiment of the present invention.

Figure 2:
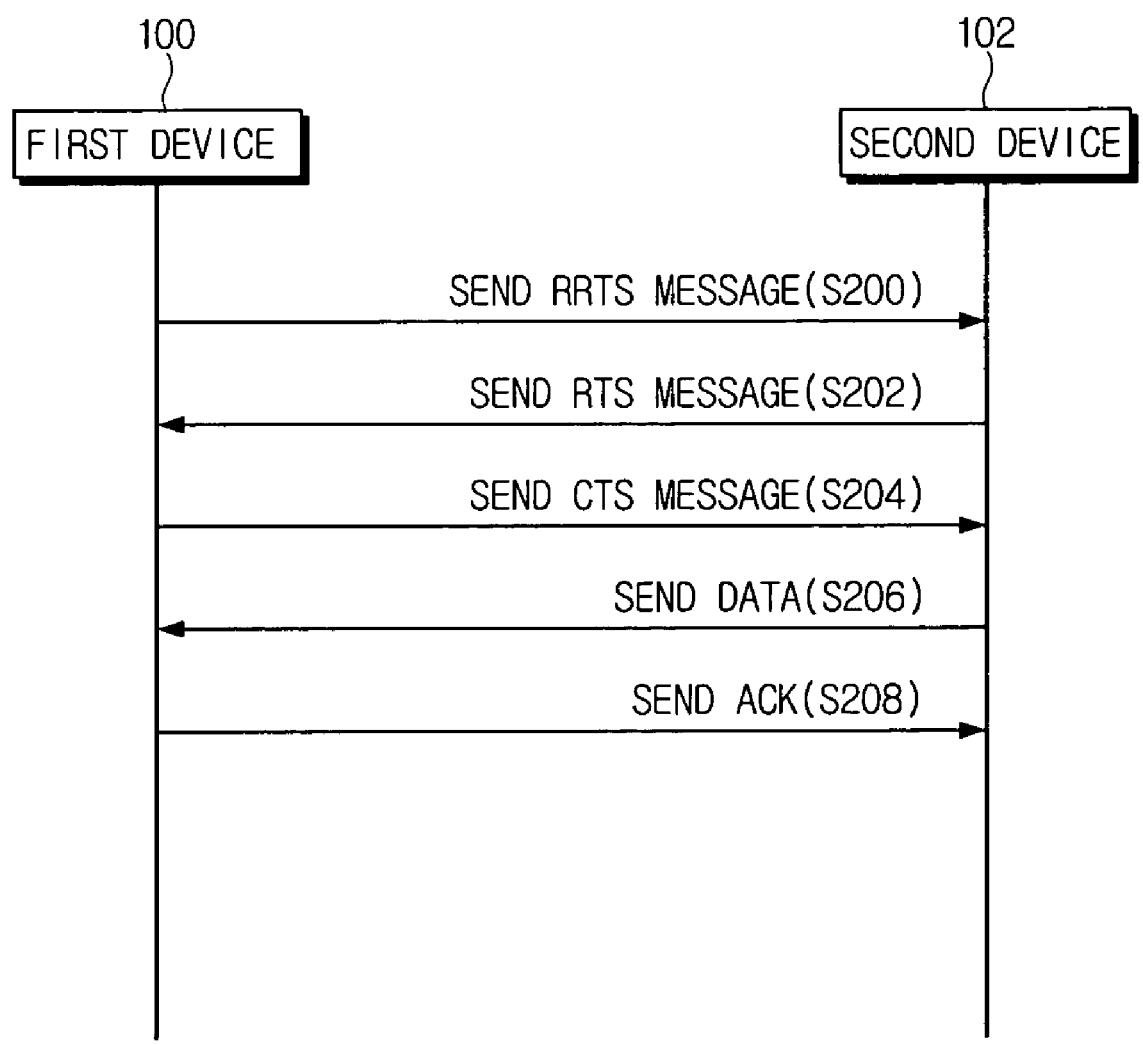
FIG. 2 illustrates message transmission and reception between devices based on the CSMA/CA scheme according to an embodiment of the present invention.

FIG. 2 illustrates a second device 102 transmitting data and a first device 100 receiving the data from the second device 102 according to an embodiment of the present invention.

The first device 100, which changes its state from a sleep mode to a wake-up mode, transmits a request-to-RTS (RRTS) message (S200). Generally, the first device 100 broadcasts the RRTS message to its adjacent devices. Although only the second device 102 receives the RRTS message in FIG. 2, and although not illustrated, all devices adjacent to the first device 100 receive the RRTS message. The RRTS message indicates that the first device 100 has changed its state from the sleep mode to the wake-up mode, and that the first device 100 is capable of receiving data. It may happen that the second device 102 cannot receive the RRTS message from the first device 100. For instance, the second device 102 in the sleep mode cannot receive the RRTS message from the first device 100. Conversely, devices being waken-up and adjacent to the first device 100 receive the RRTS message. In FIG. 2, it is assumed that the second device 102 is in the wake-up mode.

When data to be transmitted to the first device 100 is generated, the second device 102 sends a request-to-send (RTS) message to the first device 100 (S202).

Upon receiving the RTS message, the first device 100 determines whether to send a clear-to-send (CTS) message in reply to the RTS message. If two or more RTS messages are received, the first device 100 selects the earliest received RTS message. The first device 100 transmits the CTS message to a device sending the selected RTS message. The first device 100 does not send any message to a device which transmits the unselected RTS message.

In FIG. 2, the first device 100 selects the second device 102, and thus sends the CTS message to the second device 102 (S204).

The second device 102 sends the data to the first device 100 (S206). If the second device 102 does not receive the CTS message, the second device 102 repeats transmission of the RTS message to the first device 100. The first device 100 sends to the second device 102 an acknowledgement (ACK) message indicating the successful data reception without errors (S208). Although not illustrated, it is to be noted that the first device 100 can request the data retransmission by sending a negative ACK (NAK) to the second device 102 when erroneous data reception happens.

Figure 3:
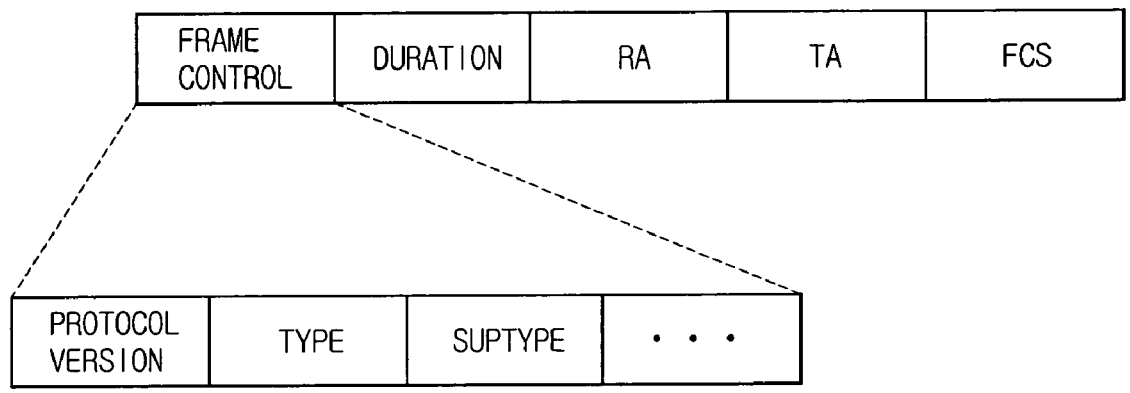
FIG. 3 illustrates a frame structure of a RRTS message according to an embodiment of the present invention.

FIG. 3 is a frame structure of the RRTS message according to an embodiment of the present invention.

The RRTS message frame includes a frame control field, a duration/ID field, a receiver address (RA) field, a transmitter address (TA) field, and a frame check sequence (FCS) field.

The frame control field includes a protocol version field, a type field, a subtype field, and the like. The protocol version field indicates a version of the RRTS message. The type field and the subtype field indicate a function of the frame. Typically, the function of the frame carries out one of control, data, and management functions. The RRTS message, the RTS message, the CTS message, and the ACK message perform the control function. Table 1 shows the type field and the subtype field values with respect to the RRTS message, the RTS message, the CTS message, the data, and the ACK message.

TABLE 1

|             | Type field | Subtype field |
|-------------|------------|---------------|
| RRTS message | 01 | 1001 |
| RTS message | 01 | 1011 |
| CTS message | 01 | 1100 |
| Data | 10 | 0000 |
| ACK message | 01 | 1101 |

Duration of the duration field is presented by a time μs. The time is determined by adding a predetermined time with a time required to transmit a RTS message and a CTS message. The RA field contains an address of a device receiving the RRTS message, and the TA field contains an address of a device transmitting the RRTS message. As the RRTS message is broadcast, the RT field does not contain any address of a specific device. The FCS field contains a cyclic redundancy checking (CRC) bit that checks whether the frame is successfully received without errors.

Figure 4:
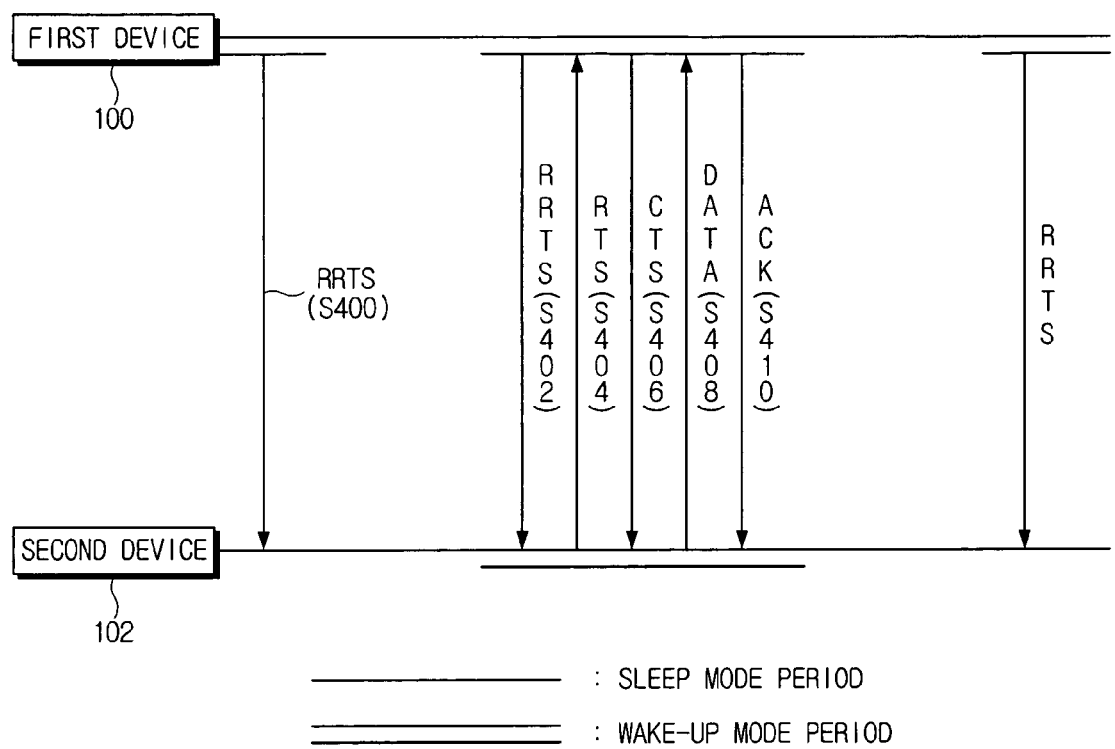
FIG. 4 illustrates another message transmission and reception between devices based on the CSMA/CA scheme according to an embodiment of the present invention.

FIG. 4 illustrates another operation between the first device 100 and the second device 102 according to an embodiment of the present invention. The first device 100 being woken-up sends a RRTS message to the sleeping second device 102 (S400). After sending the RRTS message, the first device 100 waits for a preset time. When a RTS message is received from adjacent devices within the preset time, the first device 100 sends a CTS message to the adjacent devices. When the RTS message is not received from any adjacent devices within the preset time and there is no data to be transferred to other devices, the first device 100 returns to the sleep mode. The preset time is determined in consideration of the transmission time of the RRTS message and the reception time of the RTS message.

Still referring to FIG. 4, because the RTS message is not received from the second device 102 within the specific time, the first device 100 enters the sleep mode.

The first device 100 sends a RRTS message, to the second device 102 (S402). Operations S402 through S410 correspond to respective operations S200 through S208 of FIG. 2.

Figure 5:
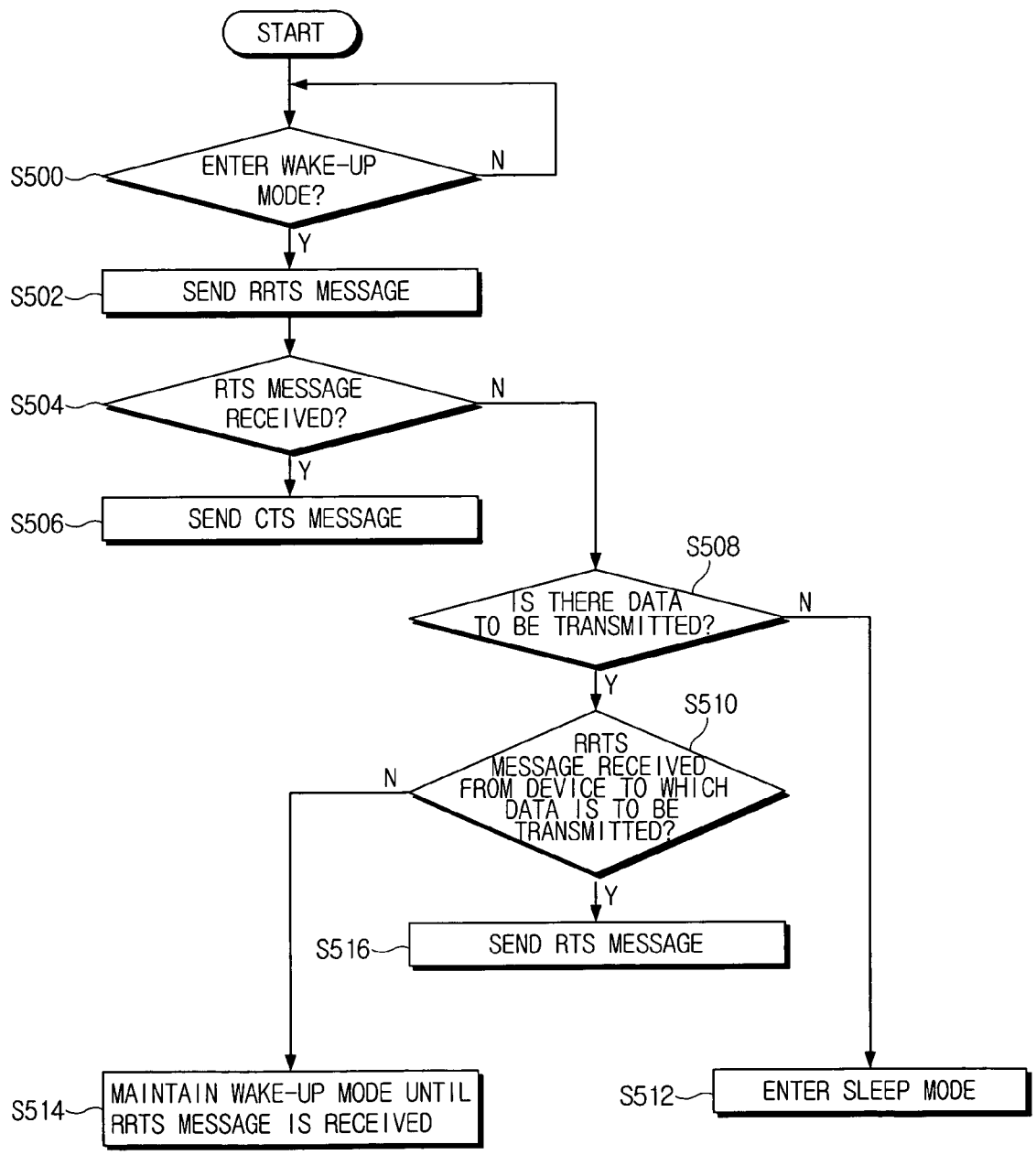
FIG. 5 illustrates an operation of the device adopting the CSMA/CA scheme.

FIG. 5 illustrates an operation of a device according to an embodiment of the present invention.

The device determines whether its state is changed from the sleep mode to the wake-up mode (S500). If so, the device proceeds to operation S502, or if not, the device returns to operation S500. The device generates and broadcasts a RRTS message to adjacent devices (S502). The RRTS message is broadcast only when the device is changed from the sleep mode to the wake-up mode. When the wake-up mode is maintained, the RRTS message is not broadcast.

If the device does not enter the wake-up mode at operation S501, the device determines whether a RTS message is received from the adjacent devices (S504). If so, the device proceeds to operation S506, or if not, the device proceeds to operation S508.

When one RTS message is received at operation S506, the device sends a CTS message to a device transmitting the RTS message (S506). When receiving at least two RTS messages, the device selects the previous RTS message and sends a CTS message to an adjacent device transmitting the selected RTS. The data reception and the ACK message transmission are similar to those previously described. Accordingly, further description thereof is omitted.

The device determines whether there is data to be transmitted to the adjacent devices (S508). If so, the device proceeds to operation S510, or if not, the device proceeds to operation S512. The device enters the sleep mode (S512). It should be understood that FIG. 5 illustrates operation S508 follows operation S504, but not limited to this order. The device, after transmitting the RRTS, can determine whether there is data to be transmitted to the adjacent devices before determining whether the RTS message is received.

The device determines whether a RRTS message is received from a device to which the data will be transmitted (S510). If so, the device proceeds to operation S516, or if not, the device proceeds to operation S514.

The device maintains the wake-up mode until the RRTS message is received (S514). If the RRTS message is not received over a specific time, the device may enter the sleep mode according to the user's setup. The device sends the RTS message (S516). The transmissions and the receptions of the CTS message, the data, and the ACK message after the RTS message delivery are not explained herein for brevity.

Figure 6:
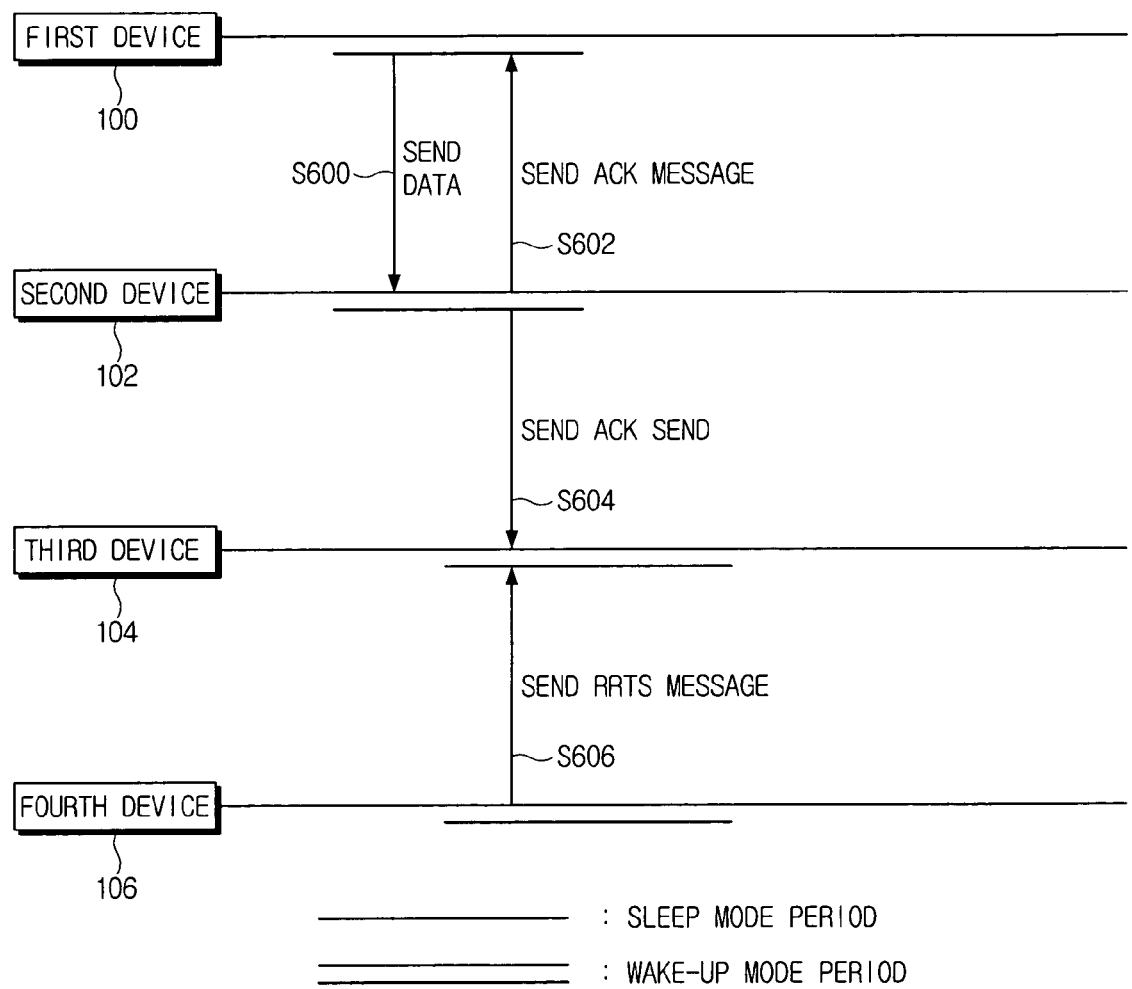
FIG. 6 illustrates at least two messages prevented from colliding with each other.

FIG. 6 illustrates devices operating based on the asynchronous power management according to an embodiment of the present invention.

The system adopting the asynchronous power management includes first through fourth devices 100, 102, 104, and 106. The first device 100 and the second device 102 transceive data with each other as shown in FIGS. 2 and 4. In detail, the first device 100 sends data to the second device 102 (S600), and the second device 102 sends the ACK message to the first device 100 (S602).

The fourth device 106, which changes from the sleep mode to the wake-up mode, sends the RRTS message to the third device 106 (S606). The third device 104 receives the ACK message from the second device (S604). That is, the third device 106 receives the ACK message (S604), and receives the RRTS message (S606). The system in FIG. 6 sends and receives the data and messages using the single radio resource. The ACK message received in operation S604 and the RRTS message received in operation S606 collide at the third device 104. To address this problem, the fourth device 106 broadcasts the RRTS message after a preset time after changing from the sleep mode to the wake-up mode, not right after entering the wake-up mode.

The preset time is determined by adding a time required to transmit the data and a time required to transmit the ACK message in the system. Accordingly, the third device 104 can receive data or messages from both the second and fourth devices 102 and 106, which are its adjacent device, without collisions.

In light of the foregoing as explained above, as the device entering the wake-up mode from the sleep mode informs its adjacent devices of its state changes, the adjacent devices can reduce the power consumed to call the device.

Although an embodiment of the present invention has been shown and described, the present invention is not limited to the described embodiment. Instead, it would be appreciated by those skilled in the art that changes may be made to the embodiment without departing from the principles and spirit of the invention, the scope of which is defined by the claims and their equivalents.

What is claimed is:

1. A method of transmitting data from a second device to a first device in a communication system including at least the two devices, the first and second devices each entering a sleep mode in which a device cannot receive messages and a wake-up mode in an alternating manner, comprising:

broadcasting from the first device a message containing state change information to devices adjacent to the first device of which a state is changed from the sleep mode to the wake-up mode;

transmitting from the second device to the first device a message advising of data to be transmitted by the second device upon receipt by the second device of the message containing the state change information of the first device from a sleep mode in which the first device cannot receive messages to a wake-up mode;

transmitting from the first device to the second device a message permitting transfer of the data to be transmitted upon receipt by the first device of the message of data to be transmitted; and transmitting the data from the second device to the first device upon receipt by the second device of the message permitting transfer of the data to be transmitted, wherein if there is no data to be transmitted by the second device then the second device enters the sleep mode in which the second device cannot receive messages.

2. The method according to claim 1, wherein devices in the wake-up mode receive a message containing the state change information.

3. The method according to claim 2, wherein a message permitting the data transfer is transmitted to a device according to a priority when data to be transmitted is informed from at least two devices.

4. The method according to claim 1, wherein the first device entering the wake-up mode broadcasts a message containing the state change information after a specific time.

5. The method according to claim 4, wherein the specific time is determined by adding a time required to transfer the data and a time required to transmit an acknowledgement (ACK) message in reply to the data transfer.

6. The method according to claim 1, wherein the communication system transmits and receives data and messages using a single radio resource.

7. The method according to claim 1, wherein the devices in the communication system independently change to the sleep mode and the wake-up mode in an alternative manner.

8. A communication system including at least two devices that each enter a sleep mode in which a device cannot receive messages and a wake-up mode in an alternating manner, comprising:

a first device to broadcast a message containing state change information to adjacent devices when the first device changes from the sleep mode to the wake-up mode, and to transmit a message permitting data transfer when the first device is informed of data to be transmitted; and a second device to inform the first device of the data to be transmitted when the message containing the state change information is received, and to transmit the data to the first device when the message permitting the data transfer is received containing state change information of the first device from a sleep mode in which the first device cannot receive messages to a wake-up mode, wherein if there is no data to be transmitted by the second device then the second device enters the sleep mode in which the second device cannot receive messages.

9. The communication system according to claim 8, wherein the second device is in the wake-up mode.

10. The communication system according to claim 9, wherein the first device transmits a message permitting the data transfer to a device according to a priority when the first device is informed of data to be transmitted from more than one device.

11. The communication system according to claim 8, wherein the first device broadcasts a message containing the state change information after a specific time after entering the wake-up mode.

12. The communication system according to claim 11, wherein the specific time is the sum of a time required to transfer the data and a time required to transmit an acknowledgement (ACK) message in reply to the data transfer.

13. The communication system according to claim 8, wherein the communication system transmits and receives data and messages using a single radio resource.

14. A communication system, comprising:

a first device switchable between a sleep mode in which the device cannot receive messages and a woken-up mode in which the device can receive messages; and a second device switchable between the sleep mode and the woken-up mode, wherein the first device broadcasts a request-to-request-to-transmit (RRTS) message to nearby devices when the first device changes from a sleep mode to a wake-up mode, the second device sends a request-to-transmit (RTS) message to the first device after receiving the RRTS message containing state change information of the first device from a sleep mode in which the first device cannot receive messages to a woken-up mode when data to be transmitted to the first device is present, the first device sends a clear to transmit (CTS) message to the second device after receiving the RTS message, and the second device sends the data to the first device after receiving the CTS message, and when data to be transmitted to the first device is not present the second device enters the sleep mode in which the second device cannot receive messages.

15. The communication system of claim 14, wherein there are plural second devices, and wherein, when the first device receives more than one RTS message from the plural second devices, the first device selects the earliest received RTS message and transmits the CTS message to a second device sending the selected RTS message.

16. The communication system of claim 14, wherein the RRTS message includes a frame control field, a duration/ID field, a receiver address (RA) field, a transmitter address (TA) field, and a frame check sequence (FCS) field.

17. A method of reducing power consumption when transmitting data between devices in a communication system including at least the two devices which each alternately enter a sleep mode in which the device cannot receive messages and an awake mode, comprising:

sending a notification from one device to adjacent devices that the one device has changed from sleep mode to awake mode and is ready to receive data;

sending an indication to the one device of data to be transmitted by another device to the one device after the another device receives the notification containing state change information of the one device from a sleep mode in which the one device cannot receive messages to an awake mode;

sending a message to the another device that at least one frequency is available to transmit the data to the one device after the one device receives the indication; and transmitting the data from the another device to the one device after the another device receives the message, wherein if there is no data to be transmitted by the another device then the another device enters the sleep mode in which the another device cannot receive messages.

* * * * *